United States Patent
Ohmi et al.

(10) Patent No.: US 7,330,496 B2
(45) Date of Patent: Feb. 12, 2008

(54) SYSTEM AND METHOD FOR SPREAD SPECTRUM COMMUNICATION

(75) Inventors: Shinichiro Ohmi, Toyono-gun (JP); Yasuo Harada, Kobe (JP); Kazuhiro Ando, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 496 days.

(21) Appl. No.: 10/491,925

(22) PCT Filed: Oct. 16, 2002

(86) PCT No.: PCT/JP02/10728

§ 371 (c)(1),
(2), (4) Date: Apr. 8, 2004

(87) PCT Pub. No.: WO03/036840

PCT Pub. Date: May 1, 2003

(65) Prior Publication Data

US 2005/0018753 A1    Jan. 27, 2005

(30) Foreign Application Priority Data

Oct. 19, 2001  (JP) .............................. 2001-321655

(51) Int. Cl.
*H04B 1/00* (2006.01)

(52) U.S. Cl. ............... 375/130; 375/141; 375/146; 375/147

(58) Field of Classification Search ............... 375/141, 375/130, 134, 137, 145, 149; 370/320; 398/77, 398/78

See application file for complete search history.

(56) References Cited

U.S. PATENT DOCUMENTS 5,282,222 A * 1/1994 Fattouche et al. .......... 375/260
5,555,268 A * 9/1996 Fattouche et al. .......... 375/141
5,574,747 A * 11/1996 Lomp ......................... 375/144
2002/0051433 A1* 5/2002 Affes et al. ................. 370/335
2003/0095529 A1* 5/2003 Petre et al. ................. 370/342

FOREIGN PATENT DOCUMENTS

| JP | 6-91509 | 11/1994 |
|----|---------|---------|
| JP | 2929244 | 5/1999  |

OTHER PUBLICATIONS

Naoki Suehiro: "Pseudo-Polyphase Orthogonal Sequence Sets with Good Cross-Correlation Property," Applied Algebra, Algebraic Algorithms and Symposium AAECC, 1991, pp. 106-112, CP000199050, Abstract.

* cited by examiner

*Primary Examiner*—Mohammed Ghayour
*Assistant Examiner*—Sonia J King
(74) *Attorney, Agent, or Firm*—Wenderoth, Lind & Ponack, L.L.P.

(57) ABSTRACT

A spreading code generating apparatus carries out M-sequence multiplication and zero value addition of generated orthogonal codes to obtain channel identification codes, and then carries out inverse Fourier transform of the channel identification codes to generate spreading codes and inverse spreading codes. A transmitting apparatus and a receiving apparatus store the spreading codes and the inverse spreading codes generated by the spreading code generating apparatus, respectively, and use a single code respectively selected from the stored codes to carry out spread spectrum communication. With the use of the spreading codes for spreading, the input signal is spread over a wide frequency band with uniform power on the frequency axis. Thus, transmission characteristics are improved, and multiplexing capacity is increased.

16 Claims, 6 Drawing Sheets

SYSTEM AND METHOD FOR SPREAD SPECTRUM COMMUNICATION

TECHNICAL FIELD

This invention relates to a system and a method for spread spectrum communication for spreading an input signal over a wide frequency band for communication.

BACKGROUND ART

In conventional spread spectrum communication using Direct Sequence (DS) spreading schemes, orthogonal codes such as Walsh codes, Hadamard codes, and Gold codes, or PN (Pseudorandom Noise) codes are used as spreading codes. For example, Japanese Patent No. 2929244 discloses two types of PN codes for use as the spreading codes, and Japanese Patent Publication No. 6-91509 discloses codes generated by combining two or more types of PN codes for use as the spreading codes. As such, in the conventional spread spectrum communication, spreading codes orthogonal to each other on the time axis are used.

However, the spreading codes used for conventional spread spectrum communication are orthogonal to each other only on the time axis, and the electric power characteristics of a spread signal are not uniform on the frequency axis. Therefore, in the conventional spread spectrum communication, transmission characteristics and multiplexing capacity have certain limitations.

Therefore, an object of the present invention is to provide a spread spectrum communication system and a spread spectrum communication method that are superior to conventional ones in transmission characteristics and multiplexing capacity.

DISCLOSURE OF THE INVENTION

To achieve the object mentioned above, the present invention has the following aspects.

A first aspect of the present invention is directed to a communication system for carrying out spread spectrum communication, including:

a first storage section for storing a spreading code;

a second storage section for storing an inverse spreading code corresponding to the spreading code stored in the first storage section;

a spreading section for spreading an input signal using the spreading code stored in the first storage section; and an inverse spreading section for inversely spreading a signal outputted from the spreading section, wherein the spreading code stored in the first storage section is included in a vector group obtained by carrying out inverse Fourier transform of a plurality of different channel identification codes.

In the first aspect, the different channel identification codes are subjected to inverse Fourier transform, and the resultant codes are used as spreading codes. When these spreading codes are subjected to Fourier transform, absolute values of the resultant elements are constant. Therefore, with the use of such spreading code for spreading, the input signal is spread with uniform power on the frequency axis. Such spectrum spreading with uniform power on the frequency axis improves transmission characteristics and increases multiplexing capacity.

According to a second aspect of the present invention based on the first aspect, each element of the spreading code stored in the first storage section is a complex number, and each element of the inverse spreading code stored in the second storage section is a complex number, the spreading section carries out complex multiplication of the input signal and each element of the spreading code stored in the first storage section, and the inverse spreading section carries out complex multiplication of the signal outputted from the spreading section and each element of the inverse spreading code stored in the second storage section.

In the second aspect, the input signal is spread by using the spreading code whose elements are complex numbers, and the spread signal is inversely spread by using the inverse spreading code whose elements are complex numbers.

According to a third aspect of the present invention based on the second aspect, the communication system further includes a modulating section for carrying out quadrature modulation of a carrier by using the signal outputted from the spreading section, and a demodulating section for carrying out quadrature demodulation of a signal outputted from the modulating section, and outputting the demodulated signal to the inverse spreading section.

In the third aspect, the carrier is subjected to quadrature modulation by using the real part and the imaginary part of the spread signal, and the modulated carrier is then subjected to quadrature demodulation. Thus, it is possible to reproduce the spread signal by the receiving apparatus.

According to a fourth aspect of the present invention based on the third aspect, each element of the inverse spreading code stored in the second storage section is a conjugate complex number of a corresponding element of the spreading code stored in the first storage section.

In the fourth aspect, the spread signal is inversely spread by using the inverse spreading code which is the conjugate number of the spreading code. Thus, the coordinate axis which was rotated by a predetermined amount at the time of spreading can be returned to its original position at the time of inverse spreading.

According to a fifth aspect of the present invention based on the first aspect, the communication system further includes a filter section for outputting low-frequency components of a signal outputted from the inverse spreading section.

In the fifth aspect, it is possible to produce an output signal corresponding to the input signal.

According to a sixth aspect of the present invention based on the first aspect, the communication system further includes a synchronization tracking section for finding a synchronization point for the inverse spreading code stored in the second storage section by detecting a peak point of a signal outputted from the inverse spreading section.

In the sixth aspect, the synchronization point of the spread signal can be found by the receiving apparatus.

According to a seventh aspect of the present invention based on the first aspect, the input signal supplied to the spreading section is a complex number composed of a real part and an imaginary part.

In the seventh aspect, it is possible to transmit an input signal subjected to baseband modulation in the QPSK (Quadrature Phase Shift Keying) scheme, the 16 QAM (Quadrature Amplitude Modulation) scheme, or the like.

According to an eighth aspect based on the first aspect, the channel identification codes are numerical value sequences of orthogonal codes.

According to a ninth aspect based on the first aspect, the channel identification codes are numerical value sequences of Walsh codes.

According to a tenth aspect based on the first aspect, the channel identification codes are numerical value sequences of Hadamard codes.

According to an eleventh aspect based on the first aspect, the channel identification codes are numerical value sequences of Gold codes.

In the eighth to eleventh aspects, by carrying out inverse Fourier transform of orthogonal codes, Walsh codes, Hadamard codes, or Gold codes, it is possible to find spreading codes orthogonal to each other on the frequency axis.

According to a twelfth aspect of the present invention based on the first aspect, the channel identification codes are numerical value sequences obtained by multiplying numerical value sequences of orthogonal codes by an M-sequence.

In the twelfth aspect of the present invention, the numerical value sequence obtained by multiplying the orthogonal code by the M-sequence is subjected to inverse Fourier transform. Thus, it is possible to find spreading codes orthogonal to each other on the frequency axis. Also, it is possible to randomize a bit pattern of the channel identification codes.

According to a thirteenth aspect of the present invention based on the first aspect, the channel identification codes are numerical value sequences obtained by adding or inserting a predetermined number of zero values at a same position in different numerical value sequences.

In the thirteenth aspect, the numerical value sequence obtained by adding or inserting a predetermined number of zero values at the same position in different numerical value sequences is subjected to inverse Fourier transform. Thus, when the spread signal is transformed on the frequency axis, it is possible to free up a frequency band as an unused frequency band. In one example, by adding zero values at the head and the tail of each numerical value sequence, a guard band can be provided between two spread signals on the frequency axis, thereby simplifying the construction of the filter of the receiving apparatus for extracting a required band. In another example, by inserting zero values in the middle of each numerical value sequence, a carrier hole can be provided on the frequency axis, thereby preventing another system from interfering with a carrier of the frequency band.

A fourteenth aspect of the present invention is directed to a transmitting apparatus for spread spectrum communication. The transmitting apparatus includes:

a storage section for storing a spreading code; and a spreading section for spreading an input signal by using the spreading code stored in the storage section, wherein the spreading code is included in a vector group obtained by carrying out inverse Fourier transform of a plurality of different channel identification codes.

In the fourteenth aspect, a transmitting apparatus for carrying out spectrum spreading with uniform power on the frequency axis can be structured. By carrying out spectrum communication by using this transmitting apparatus and a receiving apparatus corresponding thereto, the transmission characteristics are improved, and multiplexing capacity is increased.

A fifteenth aspect of the present invention is directed to a receiving apparatus for spread spectrum communication. The receiving apparatus includes:

a storage section for storing an inverse spreading code corresponding to a spreading code; and an inverse spreading section for inversely spreading a signal that has been spread with the spreading code, by using the inverse spreading code stored in the storage section, wherein the spreading code is included in a vector group obtained by carrying out inverse Fourier transform of a plurality of different channel identification codes.

In the fifteenth aspect, a receiving apparatus for carrying out spectrum spreading with uniform power on the frequency axis can be structured. By carrying out spectrum communication by using this receiving apparatus and a transmitting apparatus corresponding thereto, the transmission characteristics are improved, and multiplexing capacity is increased.

A sixteenth aspect of the present invention is directed to a communication method for carrying out spread spectrum communication. The method includes the steps of:

spreading an input signal by using a spreading code;

transmitting the signal spread in the spreading step;

receiving the signal transmitted in the transmitting step; and inversely spreading the signal received in the receiving step by using an inverse spreading code corresponding to the spreading code, wherein the spreading code is included in a vector group obtained by carrying out inverse Fourier transform of a plurality of different channel identification codes.

A seventeenth aspect of the present invention is directed to a transmitting method for spread spectrum communication. The transmitting method includes the steps of:

spreading an input signal by using a spreading code; and transmitting the signal spread in the spreading step, wherein the spreading code is included in a vector group obtained by carrying out inverse Fourier transform of a plurality of different channel identification codes.

An eighteenth aspect of the present invention is directed to a receiving method for spread spectrum communication. The receiving method includes the steps of:

receiving a signal that has been spread with a spreading code; and inversely spreading the signal received in the receiving step by using an inverse spreading code corresponding to the spreading code, wherein the spreading code is included in a vector group obtained by carrying out inverse Fourier transform of a plurality of different channel identification codes.

BEST MODE FOR CARRYING OUT THE INVENTION

Figure 1:
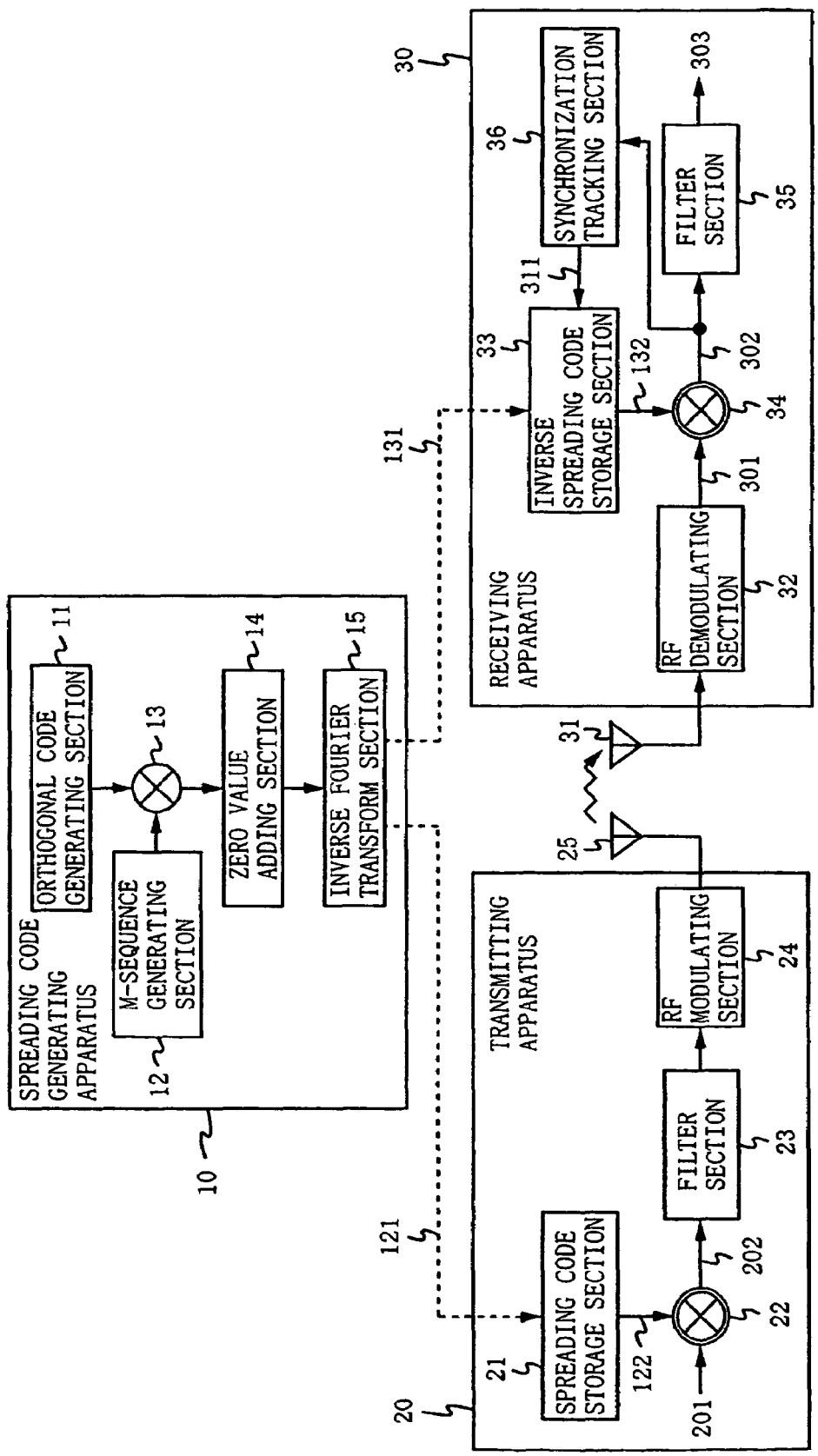
FIG. 1 is a block diagram illustrating the configuration of a communication system according to an embodiment of the present invention.

FIG. 1 is a block diagram illustrating the configuration of a communication system according to one embodiment of the present invention. The communication system according to the present embodiment includes a transmitting apparatus 20 and a receiving apparatus 30, between which spread spectrum communication is carried out. Before communication is carried out, a spreading code generating apparatus 10 generates spreading codes 121 to be used in the transmitting apparatus 20 and an inverse spreading codes 131 to be used in the receiving apparatus 30. The spreading code generating apparatus 10 includes an orthogonal code generating section 11, an M-sequence generating section 12, a multiplier 13, a zero value adding section 14, and an inverse Fourier transforming section 15. The transmitting apparatus 20 includes a spreading code storage section 21, a spreading section 22, a filter section 23, an RF (Radio Frequency) modulating section 24, and an antenna 25. The receiving apparatus 30 includes an antenna 31, an RF demodulating section 32, an inverse spreading code storage section 33, an inverse spreading section 34, a filter section 35, and a synchronization tracking section 36.

First, the operation of the spreading code generating apparatus 10 is described. Before spread spectrum communication is carried out between the transmitting apparatus 20 and the receiving apparatus 30, the spreading code generating apparatus 10 operates as follows. The orthogonal code generating section 11 generates an orthogonal code that includes a predetermined number of vectors having a predetermined length and containing elements each indicating 1 or −1. Examples of such orthogonal codes are Hadamard codes, Walsh codes, and Gold codes.

The M-sequence generating section 12 generates an M-sequence (maximum length sequence) having the same length as the vector generated by the orthogonal code generating section 11 and containing elements each indicating 1 or −1. To generate an M-sequence having an arbitrary length, an m-stage shift register is used to find an M-sequence having a length of $(2^m-1)$, and the found M-sequence is repeated as required.

The multiplier 13 multiplies, element by element, each vector included in the orthogonal codes generated by the orthogonal code generating section 11 by the M sequence generated by the M-sequence generating section 12. Specifically, consider a case where a vector of an orthogonal code generated by the orthogonal code generating section 11 is $(A_1, A_2, \ldots, A_n)$ and the M-sequence generated by the M-sequence generating section 12 is $(B_1, B_2, \ldots, B_n)$. In this case, the multiplier 13 outputs $(A_1B_1, A_2B_2, \ldots, A_nB_n)$ as a product of both elements. This M-sequence multiplication is to randomize a bit pattern of the channel identification code, which is described further below.

The zero value adding section 14 adds a predetermined number of zero values to the head and the tail of each vector outputted from the multiplier 13. The zero value adding section 14 may add one or more zero values to either one or both of the head and the tail of each vector. When zero values are added to both the head and the tail of each vector, the number of zero values to be added to the head may be equal to the number added to the tail, or may be different therefrom. This zero value addition is to provide a guard area between two spread signals transformed on the frequency axis, thereby simplifying the structure of a filter of the receiving apparatus 30 for extracting a required band. The zero-value-added vectors are different from each other, and therefore are used as channel identification codes for spread spectrum communication.

The inverse Fourier transforming section 15 carries out inverse Fourier transform of each channel identification code obtained by the zero value adding section 14 to find a vector having the same number of elements as the original vector. A group formed by the found vectors is called "a vector group". The elements of each vector after inverse Fourier transform become complex numbers. All or part of the vectors included in the vector group obtained by the inverse Fourier transforming section 15 are used by the transmitting apparatus 20 as spreading codes 121. Further, the elements of the found vectors are replaced with their respective conjugate complex numbers, thereby obtaining inverse spreading codes 131 to be used by the receiving apparatus 30.

Figure 2:
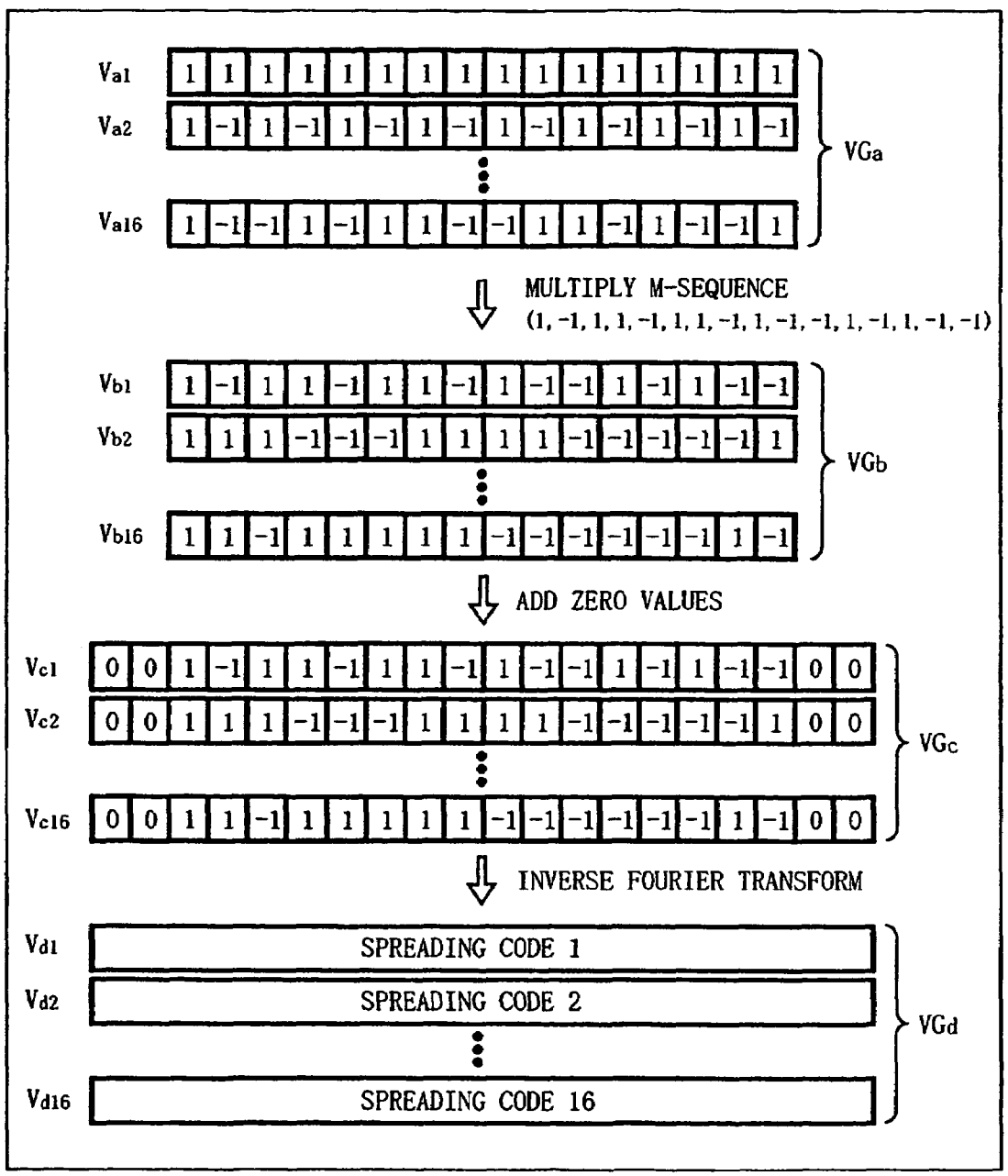
FIG. 2 is an illustration showing a process of generating spreading codes in the communication system according to the embodiment of the present invention.

With reference to FIG. 2, the operation of the spreading code generating apparatus 10 is exemplarily described. The orthogonal code generating section 11 generates, for example, a Hadamard code each including sixteen vectors having a length of 16 (a vector group $VG_a$ illustrated in FIG. 2). The M-sequence generating section 12 generates, for example, an M-sequence having a length of 16 such as (1, −1, 1, 1, −1, 1, 1, −1, 1, −1, −1, 1, −1, 1, −1, −1). The multiplier 13 multiplies, element by element, the respective elements of the sixteen vectors generated by the orthogonal code generating section 11 by the M-sequence generated by the M-sequence generating section 12 to output a vector group $VG_b$ illustrated in FIG. 2. The zero value adding section 14 adds two zero values to each of the sixteen vectors outputted from the multiplier 13 both at the head and the tail to output a vector group including sixteen vectors having a length of 20 (a vector group $VG_c$ illustrated in FIG. 2). The vectors included in the vector group $VG_c$ are used as the channel identification codes.

Figure 3:
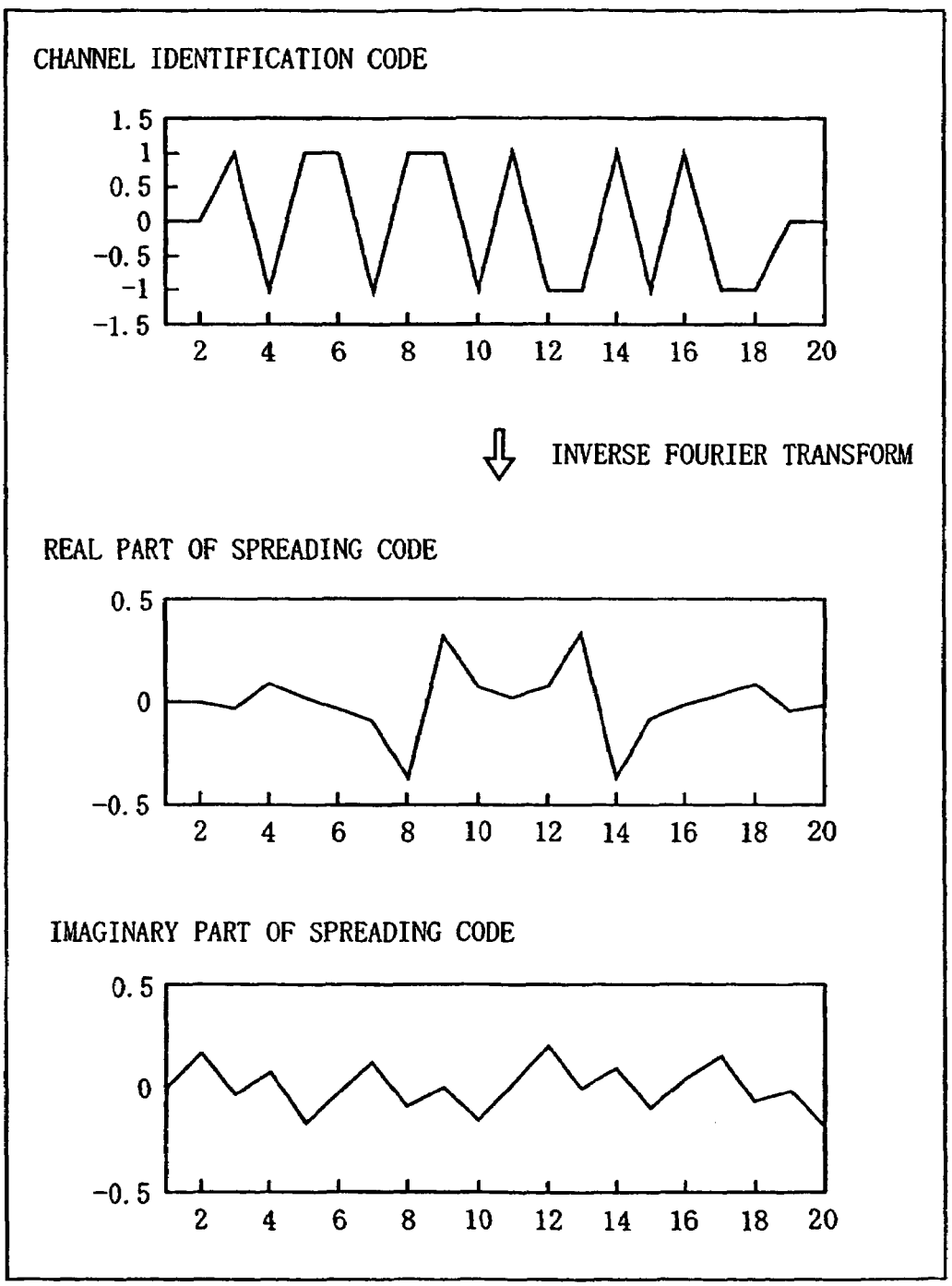
FIG. 3 is an illustration showing one example of channel identification codes and spreading codes in the communication system according to the embodiment of the present invention.

The inverse Fourier transforming section 15 carries out inverse Fourier transform of the sixteen channel identification codes obtained by the zero value adding section 14. FIG. 3 is an illustration showing one example of the channel identification codes and the spreading codes in the spreading code generating apparatus 10. FIG. 3 illustrates how a vector $V_{c1}$ illustrated in FIG. 2 is transformed to a vector $V_{d1}$ illustrated in FIG. 2 through inverse Fourier transform. The inverse transforming section 15 carries out inverse Fourier transform of the respective sixteen channel identification codes to obtain a vector group including sixteen vectors each having a length of 20 and containing elements being complex numbers (a vector group $VG_d$ illustrated in FIG. 2). All or part of the sixteen vectors included in the vector group $VG_d$ are used by the transmitting apparatus 20 as the spreading codes 121. The elements of the found vectors are replaced with their respective conjugate complex numbers, thereby obtaining the inverse spreading codes 131 to be used by the receiving apparatus 30.

Next, the operations of the transmitting apparatus 20 and the receiving apparatus 30 are described. Before communication is carried out, the transmitting apparatus 20 and the receiving apparatus 30 are supplied with the spreading codes 121 and the inverse spreading codes 131, respectively, by the spreading code generating apparatus 10. In the transmitting apparatus 20, the spreading codes 121 supplied by the spreading code generating apparatus 10 are stored in the spreading code storage section 21. In the receiving apparatus 30, the inverse spreading codes 131 supplied by the spreading code generating apparatus 10 are stored in the inverse spreading code storage section 33. The spreading codes 121 and the inverse spreading codes 131 may be stored in the respective storage sections at the time of manufacturing, or may be supplied through input means or communication means after manufacturing. Note that the number of codes stored by the spreading code storage section 21 and the inverse spreading code storage section 22 may be one, respectively.

For communication between the transmitting apparatus 20 and the receiving apparatus 30, the spreading code storage section 21 selects one spreading code 122 from the stored spreading codes 121 for output. Similarly, the inverse spreading code storage section 33 selects one inverse spreading code 132 from the stored spreading codes 131 for output. In more detail, the spreading code storage section 21 outputs, as the spreading code 122 corresponding to a channel to be used, a spreading code through inverse Fourier transform of a channel identification code for that channel. The inverse spreading code storage section 33 outputs, as the inverse spreading code 132 corresponding to a channel to be used, an inverse spreading code obtained through inverse Fourier transform of a channel identification code for that channel.

The spreading section 22 is supplied with an input signal 201 as a signal to be transmitted. The input signal 201 is a signal obtained by subjecting error correction encoding and predetermined baseband modulation to data to be transmitted. The spreading section 22 spreads the input signal 201 with the spreading code 122 stored in the spreading code storage section 21, and then outputs a spread signal 202. In more detail, the spreading section 22 is supplied with the elements of the spreading code 122 at every time interval T2, which is shorter than a time interval T1 during which the input signal 201 is changed. The spreading section 22 multiplies the input signal 201 by each element of the spreading code 122 at every time interval T2. Such multiplication of each element of the spreading code at every time interval T2 is generally called "multiplication of the spreading code at a chip rate".

In the present embodiment, each element of the spreading code 122 is a complex number. Therefore, the spreading section 22 multiplies the input signal by the spreading code 122 at a chip rate. That is, the spreading section 22 carries out complex multiplication of the input signal 201 and each element of the spreading code 122 at every time interval T2. For example, consider a case where an element of the spreading code 122 is (C+Dj) when the imaginary unit is j. When the input signal 201 indicates a real number A, the spreading section 22 outputs a signal indicative of A×(C+Dj)=(AC+ADj) as the spread signal 202. When the input signal 201 indicates a complex number (A+Bj), the spreading section 22 outputs a signal (A+Bj)×(C+Dj)={(AC−BD)+(AD+BC)j} as the spread signal 202. With such operation of the spreading section 22, the input signal 201 is spread over a wide frequency band on the frequency axis.

The filter section 23 is implemented by using a band-pass filter. The filter section 23 eliminates noise components included in an unwanted band from the spread signal 202 outputted from the spreading section 22. The RF modulating section 24 carries out quadrature modulation of a carrier with a signal outputted from the filter section 23, and outputs a signal of a radio frequency. In more detail, the RF modulating section 24 modulates the carrier with the real part of the signal outputted from the filter section 23 to a first direction, and also modulates the carrier with the imaginary part of the signal outputted from the filter section 23 to a second direction that is different from the first direction in phase by 90 degrees. The antenna 25 emits a radio wave based on the signal outputted from the RF modulating section 24.

In the receiving apparatus 30, the antenna 31 receives the radio wave emitted from the transmitting apparatus 20, and outputs a signal of a radio frequency. The RF demodulating section 32 carries out orthogonal demodulation of the signal emitted from the antenna 31 to output a baseband signal as a demodulated signal 301. In more detail, the RF demodulating section 32 demodulates the signal emitted from the antenna 31 in the above-mentioned first direction to find the real part and also in the above-mentioned second direction to find the imaginary part, and then outputs the demodulated signal 301 in complex number form.

The inverse spreading section 34 uses the inverse spreading code 132 stored in the inverse spreading code storage section 33 to carry out inverse spreading of the demodulated signal 301, and then outputs the inverse spread signal 302. In more detail, the inverse spreading section 34 carries out complex multiplication of the demodulated signal 301 and the inverse spreading code 132 at the chip rate. That is, the inverse spreading section 34 carries out complex multiplication of the demodulated signal 301 and each element of the inverse spreading code 132 at every time interval T2. For example, consider a case where an element of the inverse spreading code 132 is a complex number (C−Dj) and the demodulated signal indicates a complex number (E+Fj). In this case, the inverse spreading section 34 outputs a signal (E+Fj)×(C−Dj)={(EC+FD)+(−ED+FC)j} as the inverse spread signal 302. With such operation of the inverse spreading section 34, the input signal 201 spread over the wide area on the frequency axis is converged to a specific frequency.

The filter section 35 is implemented by using a low-pass filter. The filter section 35 eliminates noise components included in an unwanted band from the inverse spread signal 302 outputted from the inverse spreading section 34, and outputs an output signal 303. Thus, the receiving apparatus 30 can produce the output signal 303 corresponding to the input signal 201. As the input signal 201 is obtained from data to be transmitted by encoding for error correction and baseband modulation, the output signal 303 is subjected to reverse processing (that is, baseband demodulation and decoding for error correction).

The synchronization tracking section 36 outputs a synchronizing signal 311 to the inverse spreading code storage section 33. The inverse spreading code storage section 33 outputs the inverse spreading code 132 to the inverse spreading section 34 in synchronization with the synchronizing signal 311 outputted from the synchronization tracking section 36. By appropriately changing output timing of the synchronizing signal 311, the synchronization tracking section 36 detects timing when the signal outputted from the inverse spreading section 34 becomes maximum in level (the timing is referred to as a peak point). With such operation of the synchronization tracking section 36, the receiving apparatus 30 can find optimum timing for inverse spreading processing. Note that the receiving apparatus 30 may further include an AFC (Automatic Frequency Control) circuit for establishing synchronization in frequency with the transmitting apparatus 20.

Figure 4:
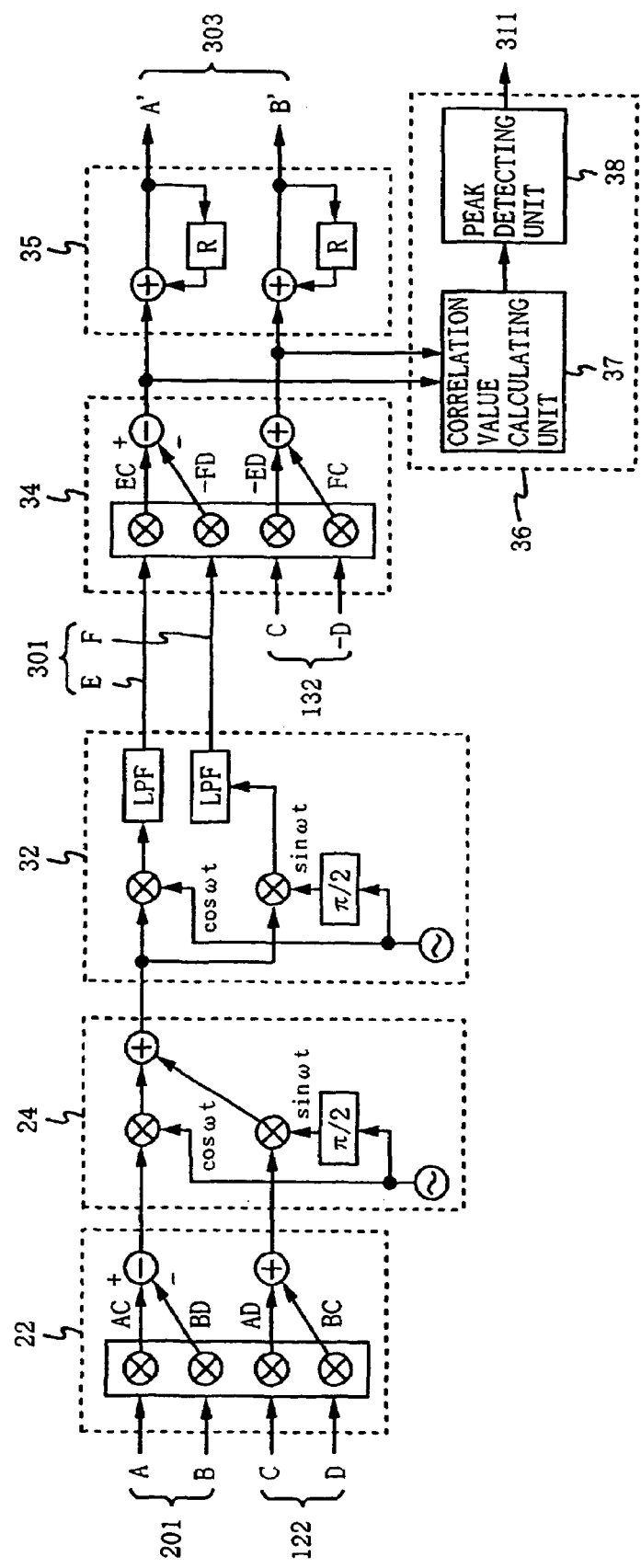
FIG. 4 is an illustration showing a detailed configuration of the communication system according to the embodiment of the present invention.

With reference to FIG. 4, main components of the transmitting apparatus 20 and the receiving apparatus 30 are described in detail. In FIG. 4, the spreading section 22, the RF modulating section 24, the RF demodulating section 32, the inverse spreading section 34, the filter section 35, and the synchronization tracking section 36 are illustrated in detail. Hereinafter, a case where the input signal 201 has been baseband-modulated with the QPSK (Quadrature Phase Shift Keying) scheme is exemplarily described. In this case, the spreading code 122, the inverse spreading code 132, the input signal 201, and the demodulated signal 301 are all complex numbers. Therefore, the spreading code 122 is denoted as (C+Dj), the inverse spreading code 132 as (C−Dj), the input signal 201 as (A+Bj), and the demodulated signal 301 as (E+Fj). In this case, A and B are 1 or −1, and C, D, and E are arbitrary real numbers.

The spreading section 22 includes four multipliers (first to fourth), a subtractor, and an adder. The first multiplier finds a product AC of the real part A of the input signal 201 and the real part C of the spreading code 122. The other three multipliers find a product BD, a product AD, and a product BC, respectively. The subtractor subtracts the product BD from the product AC to find a real part (AC−BD) of the spread signal 202. The adder adds the product AD and the product BC together to find an imaginary part (AD+BC) of the spread signal 202. The spreading section 22 outputs the real part and the imaginary part of the spread signal 202 separately.

The RF modulating section 24 includes two multipliers and an adder. One multiplier multiplies the real part of the spread signal 202 by an in-phase carrier (cosine wave), while the other multiplies the imaginary part of the spread signal 202 by an orthogonal carrier (sine wave). The adder adds signals outputted from the two multipliers together. The RF modulating section 24 outputs a single signal as a result of quadrature modulation of the carriers. Generally, in QPSK modulation, orthogonal carrier modulation is performed with four values (1, 1), (1, −1), (−1, 1), and (−1, −1). In the present embodiment, however, values other than the above four values can be used for orthogonal carrier modulation.

The RF demodulating section 32 includes two multipliers and two low-pass filters (denoted as LPF in FIG. 4). The signal outputted from the RF modulating section 24 is divided into two in the RF demodulating section 32. One multiplier multiplies one of the divided signals by the in-phase carrier (cosine wave), while the other multiplier multiplies the other by the orthogonal carrier (sine wave). The two low-pass filters respectively eliminate noise components included in an unwanted band from the signals outputted from the two multipliers. With such operation of the RF demodulating section 32, the demodulated signal 301 corresponding to the spread signal 202 is produced. The RF demodulating section 32 outputs the real part and the imaginary part of the demodulated signal 301 separately.

The inverse spreading section 34 includes four multipliers (first to fourth), a subtractor, and an adder. The first multiplier finds a product EC of the real part E of the demodulated signal 301 and the real part C of the inverse spreading code 132. The other three multipliers find a product (−FD), a product (−ED), and a product FC, respectively. The subtractor subtracts the product (−FD) from the product EC to find a real part (EC+FD) of the inverse spread signal 302. The adder adds the product (−ED) and the product FC together to find an imaginary part (−ED+FC) of the inverse spread signal 302. The inverse spreading section 34 outputs the real part and the imaginary part of the inverse spread signal 302 separately.

The filter section 35 includes two accumulators. One accumulator accumulates the real part of the inverse spread signal 302 outputted from the inverse spreading section 34 for one data symbol of the input signal 201, and outputs a real part A' of the output signal 303. Similarly, the other accumulator accumulates the imaginary part of the inverse spread signal 302 outputted from the inverse spreading section 34 for one data symbol of the input signal 201, and outputs an imaginary part B' of the output signal 303. The filter section 35 outputs the real part and the imaginary part of the output signal 303 separately.

The synchronization tracking section 36 includes a correlation value calculating unit 37 and a peak detecting unit 38. The correlation value calculating unit 37 accumulates the inverse spread signal 302 for one data symbol of the input signal 201, with the real part and the imaginary part of the inverse spread signal 302 being separate from each other. That is, the correlation value calculating unit 37 finds a complex number represented by $\{\Sigma(EC+FD)+\Sigma(-ED+FC)j\}$ (where $\Sigma$ is a sum for one data symbol of the input signal 201). The correlation value calculating unit 37 then calculates an absolute value of the found complex number for output to the peak detecting unit 38 as a correlation value. The peak detecting unit 38 outputs the synchronizing signal 311 to the inverse spreading code storage section 33 as appropriately changing output timing. When the demodulated signal 301 and the inverse spreading code 132 become synchronized with each other, the correlation value outputted from the correlation value calculating unit 37 becomes maximum. The peak detecting unit 38 detects, as a peak point, timing in which the correlation value outputted from the correlation value calculating unit 37 becomes maximum, and outputs the synchronizing signal 311 at the detected peak point.

In the above description, the input signal 201 is assumed to have been baseband-modulated with the QPSK scheme. It is also possible, however, to construct a communication system similar in configuration to the system illustrated in FIG. 4 in a case where the input signal 201 has been baseband-modulated with another quadrature modulation scheme. For example, in a case where the input signal 201 has been baseband-modulated with 16 QAM (Quadrature Amplitude Modulation) scheme, the real part A and the imaginary part B of the input signal 201 can independently take four values. The detailed structure of each system component can be the same as that illustrated in FIG. 4.

Next, effects of the communication system according to the present embodiment are described. As has been described above, the spreading code generating apparatus 10 carries out M-sequence multiplication and zero value addition of the generated orthogonal codes to find channel identification codes, and then carries out inverse Fourier transform of the channel identification codes, thereby generating the spreading codes 121 and the inverse spreading codes 131. The transmitting apparatus 20 and the receiving apparatus 30 store the spreading codes 121 and the inverse spreading codes 131, respectively, generated by the spreading code generating apparatus 10, and use a single code respectively selected from the stored codes to carry out spread spectrum communication.

The vectors of each orthogonal code generated by the spreading code generating apparatus 10 are orthogonal to each other. Since orthogonality is kept even after M-sequence multiplication and zero value addition, the channel identification codes obtained through these two processes are also orthogonal to each other. Moreover, since inverse Fourier transform is an orthogonal transform, the spreading codes obtained through inverse Fourier transform of the channel identification codes are orthogonal to each other. As such, by using spreading codes that are orthogonal to each other, the communication system according to the present embodiment can carry out spread spectrum communication as general spread spectrum communication systems using PN codes or the like.

Further, in the communication system according to the present embodiment, vectors obtained through inverse Fourier transform of the channel identification codes containing elements of 1 or −1 and orthogonal to each other are used as spreading codes. Therefore, when the spreading codes are subjected to Fourier transform, the elements obtained as a result of Fourier transform become 1 or −1, and thus their absolute values are constant. Consequently, with the use of such spreading codes for spreading, the input signal is spread over a wide frequency band with uniform power on the frequency axis. Such spectrum spreading with uniform power on the frequency axis improves transmission characteristics and increases multiplexing capacity, compared with a case of conventional spread spectrum communication not achieving uniform power on the frequency axis.

Figure 5:
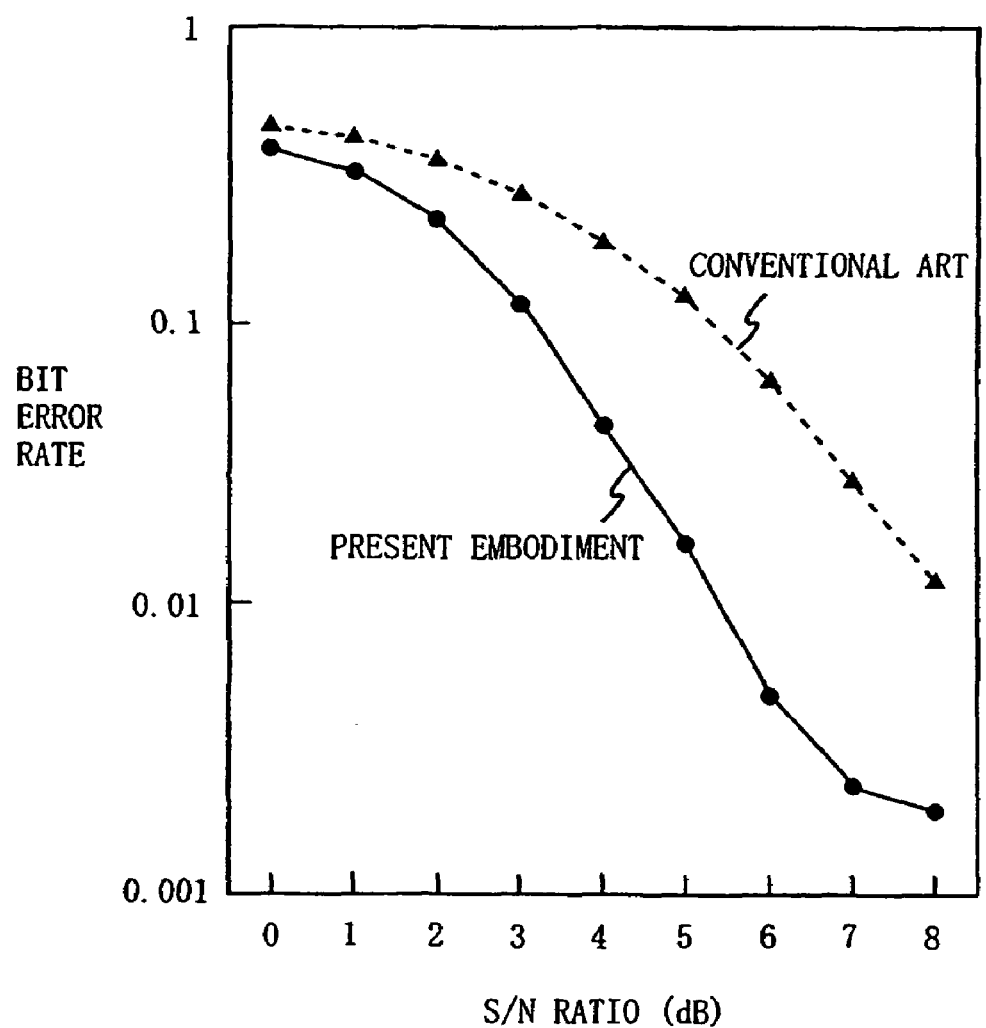
FIG. 5 is an illustration showing one example of transmission characteristics of the communication system according to the embodiment of the present invention.

FIG. 5 is an illustration showing one example of transmission characteristics of the communication system according to the present embodiment. In FIG. 5, a horizontal axis indicates an S/N ratio (signal-to-noise ratio), and a vertical axis indicates a bit error rate. The transmission characteristics of the conventional art (denoted as a broken line) are observed when Hadamard codes each having a length of 16 are used as the spreading codes. The transmission characteristics of the present embodiment (denoted as a solid line) are observed when the same Hadamard codes are inverse-Fourier-transformed and the resultant codes are used as the spreading codes. In both cases, a channel division scheme used is the CDMA (Code Division Multiple Access) scheme. As illustrated in FIG. 5, in both cases, as the S/N ratio deteriorates, the bit error rate becomes larger. However, the characteristics of the present embodiment are more advantageous than those of conventional art in that the bit error rate is smaller. Therefore, according to the communication system of the present embodiment, it is possible to increase multiplexing capacity in spread spectrum communication.

In the present embodiment, the spreading code generating apparatus 10 generates Hadamard codes as the orthogonal codes, and generates spreading codes based on the generated Hadamard codes. Alternatively, Walsh codes, Gold codes, or other codes may be used as the orthogonal codes. Further, the spreading code generating apparatus 10 may generate channel identification codes that are different from each other, and may generate spreading codes based on the generated channel identification codes. In this case, absolute values of elements of the channel identification codes are preferably equal or approximately equal to each other. Still further, the channel identification codes do not necessarily have exact orthogonality, but may merely have characteristics so that an inner product of two vectors becomes closer to zero.

Figure 6A:
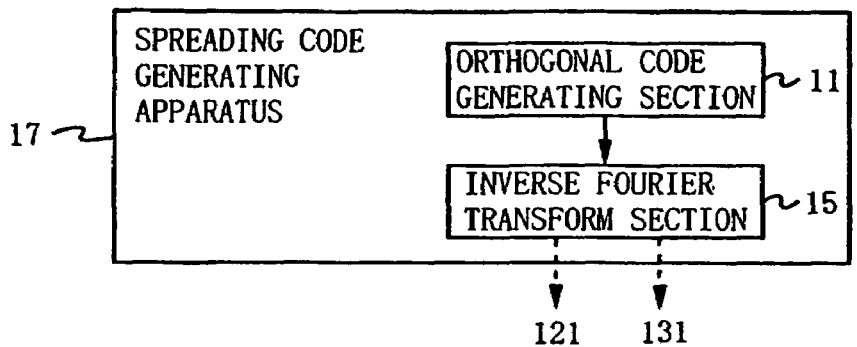
FIG. 6 is a block diagram showing other configurations of the spreading code generating apparatus according to the embodiment of the present invention.
Figure 6B:
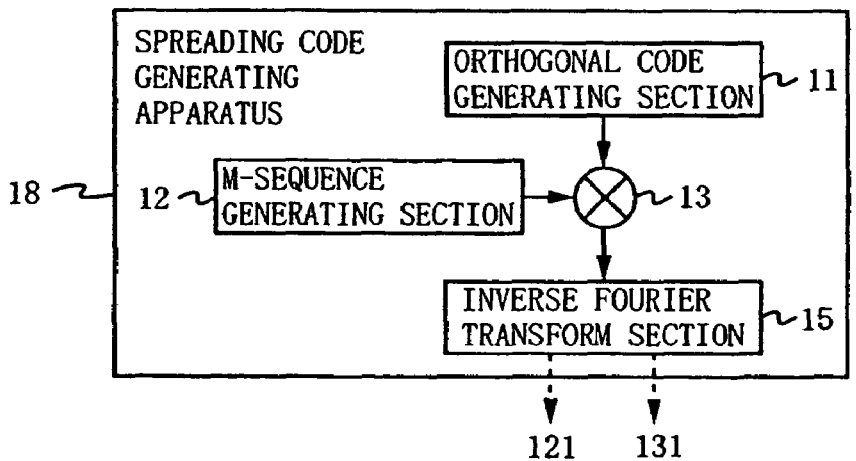
Figure 6C:
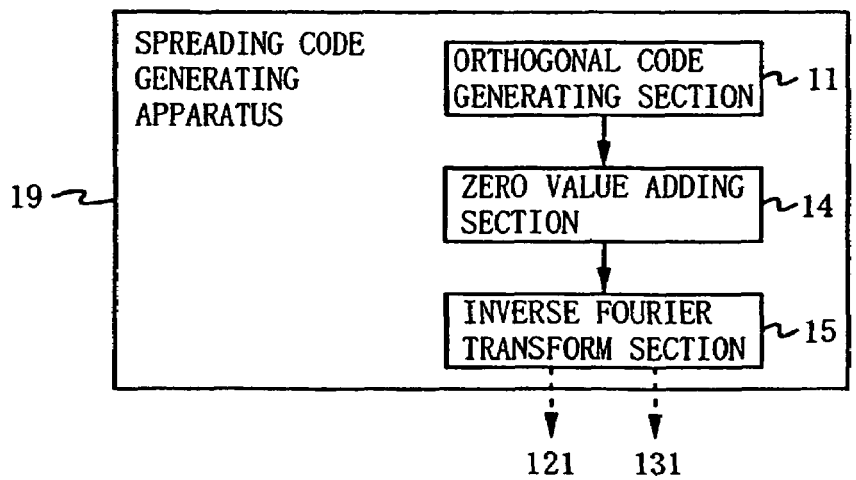

Also, in the present embodiment, the spreading code generating apparatus 10 carries out M-sequence multiplication and zero value addition of the generated orthogonal codes. Alternatively, either or both of the two processes may not be carried out. With this, as illustrated in FIG. 6, it is possible to construct a spreading code generating apparatus 17((a) of FIG. 6) that carries out inverse Fourier transform of the generated orthogonal codes; a spreading code generating apparatus 18((b) of FIG. 6) that carries out multiplication of the generated orthogonal codes, and the M-sequence and then inverse Fourier transform; and a spreading code generating apparatus 19((c) of FIG. 6) that adds zero values to the generated orthogonal codes and then carries out inverse Fourier transform. These three types of spreading code generating apparatuses can achieve the same effects as those achieved by the spreading code generating apparatus 10.

Further, in the present embodiment, the spreading code generating apparatus 10 adds a predetermined number of zero values to the head and the tail of each vector outputted from the multiplier 13. Alternatively or simultaneously, a predetermined number of zero values may be inserted at the same position of each vector outputted from the multiplier 13. Such insertion of zero values at the same position of each vector can provide a carrier hole (unused frequency band) on the frequency axis, thereby preventing another system from interfering with a carrier on the frequency band. As such, the spreading code generating apparatus 10 may add or insert a predetermined number of zero values at the same position in each different numerical value sequence.

Still further, in the present embodiment, the transmitting apparatus 20 includes the RF modulating section 24 and the antenna 25, the receiving apparatus 30 includes the antenna 31 and the RF demodulating section 32, and wireless communication is performed between the transmitting apparatus 20 and the receiving apparatus 30. Alternatively, wired communication is performed therebetween. In this case, the transmitting apparatus 20 may not carry out RF modulation, and the receiving apparatus 30 may not carry out RF demodulation.

INDUSTRIAL APPLICABILITY

As described above, the apparatus and method for spread spectrum communication uses vectors obtained by carrying out inverse Fourier transform of different channel identification codes (orthogonal codes, for example) to carry out spectrum spreading with uniform power on the frequency axis. Thus, it is possible to improve transmission characteristics and increase multiplexing capacity.

The invention claimed is:

1. A communication system for carrying out spread spectrum communication, comprising:
   first storage means for storing spreading codes orthogonal to each other;
   second storage means for storing inverse spreading codes corresponding to the spreading codes stored in the first storage means;
   spreading means for spreading an input signal by using the spreading codes stored in the first storage means; and
   inverse spreading means for inversely spreading a signal outputted from the spreading means by using the inverse spreading codes stored in the second storage means, wherein
   the spreading codes stored in the first storage means are included in a vector group obtained by carrying out inverse Fourier transform of a plurality of different channel identification codes generated from orthogonal codes,
   each element of the spreading codes is a complex number, each element of the inverse spreading codes is a complex number, and each element of the inverse spreading codes is a conjugate complex number of a corresponding element of the spreading codes,
   the spreading means carries out complex multiplication of the input signal and each element of the spreading codes, and the inverse spreading means carries out complex multiplication of the signal outputted from the spreading means and each element of the inverse spreading codes.

2. The communication system according to claim 1, further comprising:
modulating means for carrying out quadrature modulation of a carrier by using the signal outputted from the spreading means; and
demodulating means for carrying out quadrature demodulation of a signal outputted from the modulating means, and outputting the demodulated signal to the inverse spreading means.

3. The communication system according to claim 1, further comprising:
filter means for outputting low-frequency components of a signal outputted from the inverse spreading means.

4. The communication system according to claim 1, further comprising:
synchronization tracking means for finding a synchronization point for the inverse spreading codes stored in the second storage means by detecting a peak point of a signal outputted from the inverse spreading means.

5. The communication system according to claim 1, wherein
the input signal supplied to the spreading means is a complex number composed of a real part and an imaginary part.

6. The communication system according to claim 1, wherein
the channel identification codes are numerical value sequences of orthogonal codes.

7. The communication system according to claim 1, wherein
the channel identification codes are numerical value sequences of Walsh codes.

8. The communication system according to claim 1, wherein
the channel identification codes are numerical value sequences of Hadamard codes.

9. The communication system according to claim 1, wherein
the channel identification codes are numerical value sequences of Gold codes.

10. The communication system according to claim 1, wherein
the channel identification codes are numerical value sequences obtained by multiplying numerical value sequences of orthogonal codes by an M-sequence.

11. The communication system according to claim 1, wherein
the channel identification codes are numerical value sequences obtained by adding or inserting a predetermined number of zero values at a same position in different numerical value sequences.

12. A transmitting apparatus for spread spectrum communication, comprising:
storage means for storing spreading codes orthogonal to each other; and
spreading means for spreading an input signal by using the spreading codes stored in the storage means, wherein
the spreading codes are included in a vector group obtained by carrying out inverse Fourier transform of a plurality of different channel identification codes generated from orthogonal codes,
each element of the spreading codes is a complex number, and
the spreading means carries out complex multiplication of the input signal and each element of the spreading codes.

13. A receiving apparatus for spread spectrum communication, comprising:
storage means for storing inverse spreading codes corresponding to spreading codes orthogonal to each other; and
inverse spreading means for inversely spreading a signal that has been spread with the spreading codes, by using the inverse spreading codes stored in the storage means, wherein
the spreading codes are included in a vector group obtained by carrying out inverse Fourier transform of a plurality of different channel identification codes generated from orthogonal codes,
each element of the spreading codes is a complex number, each element of the inverse spreading codes is a complex number, and each element of the inverse spreading codes is a conjugate complex number of a corresponding element of the spreading codes, and
the inverse spreading means carries out complex multiplication of the signal that has been spread and each element of the inverse spreading codes.

14. A communication method for carrying out spread spectrum communication, comprising the steps of:
spreading an input signal by using spreading codes;
transmitting the signal spread in the spreading step;
receiving the signal transmitted in the transmitting step; and
inversely spreading the signal received in the receiving step by using inverse spreading codes corresponding to the spreading codes, wherein
the spreading codes are included in a vector group obtained by carrying out inverse Fourier transform of a plurality of different channel identification codes generated from orthogonal codes,
each element of the spreading codes is a complex number, each element of the inverse spreading codes is a complex number, and each element of the inverse spreading codes is a conjugate complex number of a corresponding element of the spreading codes,
the spreading step includes carrying out complex multiplication of the input signal and each element of the spreading codes, and
the inverse spreading step includes carrying out complex multiplication of the signal spread in the spreading step and each element of the inverse spreading codes.

15. A transmitting method for spread spectrum communication, comprising the steps of:
spreading an input signal by using spreading codes; and
transmitting the signal spread in the spreading step; wherein
the spreading codes are included in a vector group obtained by carrying out inverse Fourier transform of a plurality of different channel identification codes generated from orthogonal codes,
each element of the spreading codes is a complex number, and
the spreading step includes carrying out complex multiplication of the input signal and each element of the spreading codes.

16. A receiving method for spread spectrum communication, comprising the steps of:
receiving a signal that has been spread with spreading codes orthogonal to each other; and inversely spreading the signal received in the receiving step by using inverse spreading codes corresponding to the spreading codes, wherein the spreading codes are included in a vector group obtained by carrying out inverse Fourier transform of a plurality of different channel identification codes generated from orthogonal codes, each element of the spreading codes is a complex number, each element of the inverse spreading codes is a complex number, and each element of the inverse spreading codes is a conjugate complex number of a corresponding element of the spreading codes, and the inverse spreading step includes carrying out complex multiplication of the signal spread in the spreading step and each element of the inverse spreading codes.

* * * * *